(12) United States Patent
Khalifa et al.

(10) Patent No.: US 7,103,070 B2
(45) Date of Patent: Sep. 5, 2006

(54) TRANSMISSION SYSTEM COMPRISING A STATION OF A FIRST TYPE AND A STATION OF A SECOND TYPE AND SYNCHRONIZATION METHOD

(75) Inventors: Nabil Khalifa, Le Mans (FR); Serge Geslin, Le Mans (FR); Vladimir Dvorkin, Castro Valley, CA (US)

(73) Assignee: Koninklijke Philips Electronic, N.V., Eindhoven (NL)

( * ) Notice: Subject to any disclaimer, the term of this patent is extended or adjusted under 35 U.S.C. 154(b) by 733 days.

(21) Appl. No.: 09/730,679

(22) Filed: Dec. 6, 2000

(65) Prior Publication Data
US 2001/0002913 A1 Jun. 7, 2001

(30) Foreign Application Priority Data
Dec. 7, 1999 (FR) .................................. 99 15418

(51) Int. Cl.
*H04J 3/06* (2006.01)
(52) U.S. Cl. ........................ 370/503; 375/140; 375/150
(58) Field of Classification Search ................ 370/252, 370/324, 350, 395.6, 410, 503, 507–514, 370/520, 479, 335, 342; 375/135–137, 140, 375/150, 149, 347, 224; 455/13.2, 502
See application file for complete search history.

(56) References Cited

U.S. PATENT DOCUMENTS

| | | | | |
|---|---|---|---|---|
| 3,593,256 A | * | 7/1971 | Gannon | 367/134 |
| 3,864,634 A | * | 2/1975 | Dragonetti | 455/265 |
| 3,940,695 A | * | 2/1976 | Sickles, II | 455/69 |
| 4,561,089 A | * | 12/1985 | Rouse et al. | 370/479 |
| 4,601,047 A | * | 7/1986 | Horwitz et al. | 370/479 |
| 5,550,811 A | | 8/1996 | Kaku et al. | 370/18 |
| 5,742,908 A | | 4/1998 | Dent | 455/517 |
| 6,061,386 A | * | 5/2000 | Molev-Shteiman | 375/140 |
| 6,314,128 B1 | * | 11/2001 | Bunker et al. | 375/149 |
| 6,389,066 B1 | * | 5/2002 | Ejzak | 375/224 |
| 6,529,485 B1 | * | 3/2003 | Agarwal et al. | 370/324 |
| 6,735,242 B1 | * | 5/2004 | Kenney et al. | 375/150 |

* cited by examiner

*Primary Examiner*—Doris H. To
*Assistant Examiner*—Robert W. Wilson

(57) ABSTRACT

This transmission system comprises a station of a first type and a plurality of stations of a second type which include a transmitting part having a transmit timing controller for transmitting data at a transmit timing and a receiving part having synchronizing circuits for synchronization with data transmitted from the station of the first type. When the stations of the second type are moving, their transmit timing is modified to facilitate the synchronization of the reception of the station by solely being based on the receive timing at these stations of the second type.

6 Claims, 3 Drawing Sheets

TRANSMISSION SYSTEM COMPRISING A STATION OF A FIRST TYPE AND A STATION OF A SECOND TYPE AND SYNCHRONIZATION METHOD

The invention relates to a transmission system comprising at least a station of a first type and a station of a second type which include a transmitting part having a transmit timing controller for transmitting data at a transmit timing and a receiving part having synchronizing circuits for synchronization with data transmitted from another station to provide a receive timing.

The invention also relates to a synchronization method of synchronizing the stations.

The invention finds its application in the industry of radio telephony networks of the cellular type utilizing notably CDMA modulation techniques.

A problem posed with above type of system is within the synchronization of the receivers for different types of stations. To find back the information, its is necessary to effect correlations with a word formed by chips which permits to find back the value of one bit. This subject is discussed in U.S. Pat. No. 5,550,811.

Synchronization can become very difficult considering that the base stations (stations of the first type) connect to a plurality of mobile stations (stations of the second type). The work of synchronization for the receivers of the base station becomes excessive.

The present invention proposes to largely simplify the synchronization of the base stations or of the stations that communicate with a plurality of other stations.

For this purpose, such a system is characterized in that the transmit timing is fixed in response to the receive timing.

These and other aspects of the invention are apparent from and will be elucidated, by way of non-limitative example, with reference to the embodiment(s) described hereinafter.

Figure 1:
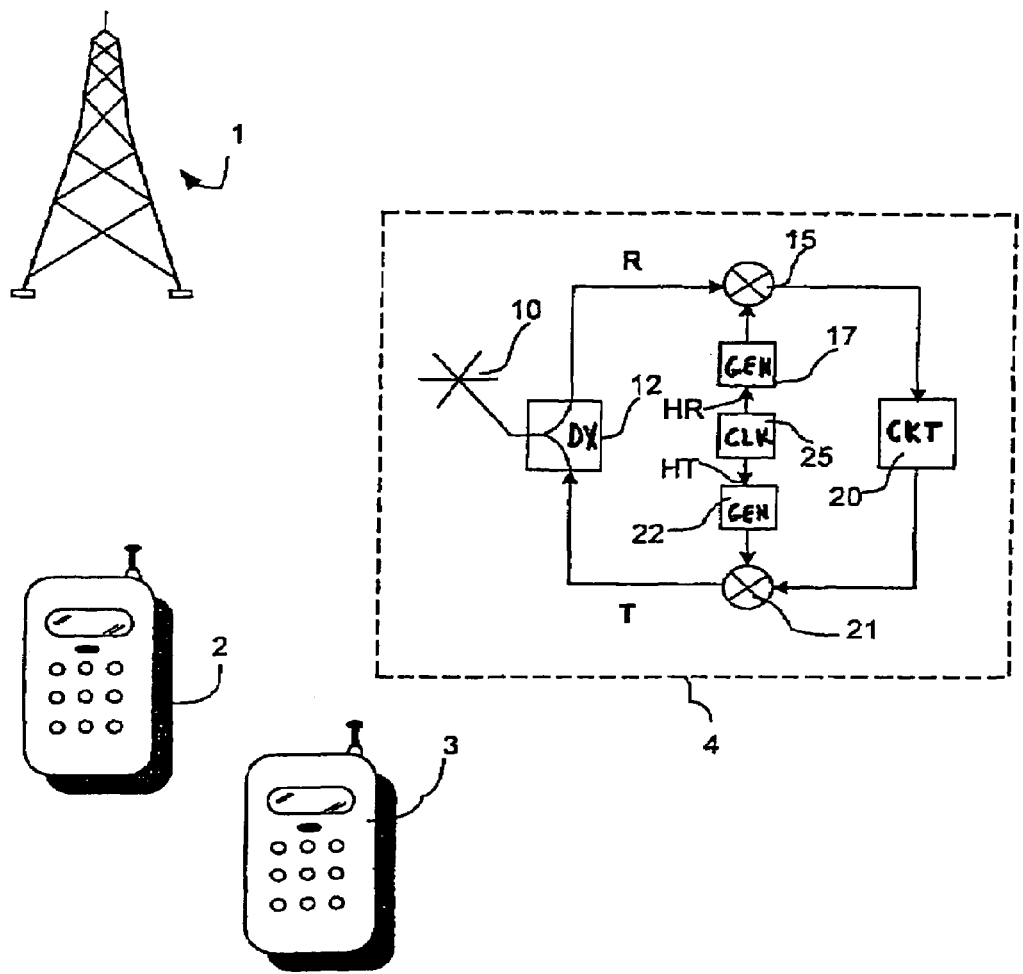
FIG. 1 represents a transmission system according to the invention.

In FIG. 1, which represents a system according to the invention, reference 1 indicates a station of the first type, which may be, for example, a base station of a radio telephone network utilizing the CDMA modulation method which is based on spectrum spreading obtained via a spectrum spreading word. The references 2, 3, 4 . . . indicate stations of the second type, which are mobile stations within the framework of the example described, which mobile stations may move with a certain speed, which leads to an apparent frequency variation both on the side of the base station and on the side of the mobile stations.

The mobile station 4 is shown in more detail. The antenna 10 is represented connected to a duplexer 12 which separates the transmit channel "T" and the receive channel "R"; a demodulator 15 permits to restore the data as a function of a spectrum spreading word assigned to the communication between base station and mobile station and coming from a spectrum spreading word generator 17, so as to supply them to a user circuit 20. Data may also come from this user circuit to be transmitted to the base station. For this purpose, by always utilizing the same CDMA method, these data formed by binary elements are "modulated" by means of a modulator 21 via a spreading word assigned to the communication in reverse direction, that is to say, from mobile station to base station. This word is produced by a spectrum spreading word generator 22. The data are finally transmitted in the direction of the base station 1. The spreading words are formed by chips whose duration is well below that of binary elements. Their rate of appearance is fixed by clock signals applied respectively to the clock inputs HT and BR of the generators 22 and 17 and processed by a clock 25.

When the mobile stations are displaced, the timing of the chips is to be adapted to the change of frequency caused by the Doppler effect. As the displacement may be effected at different speeds, the synchronization at the base station implies that a synchronizing circuit is assigned to each of the mobile stations.

One of the objects of the invention is to simplify the management of these base stations. For this purpose, the timing of the generator 22 is determined on the basis of the generator 17 to compensate the effects owing to movements of the mobile stations.

Actually, if a base station transmits at a frequency "f" due to a speed at which a mobile station moves away, the receiver of the mobile station is to synchronize with a frequency "f−Δ". If the measures according to the invention are not applied, the transmitter of the mobile station would transmit at the frequency "f" and the receiver of the base station would also have to synchronize with the frequency: "f−Δ". If the transmitter of the mobile station transmits at the frequency: "f+Δ", then the receiving frequency of the base station remains at "f", thus no measure is to be applied to the base station for synchronization with various mobile stations which move away at variable speeds.

Figure 2:
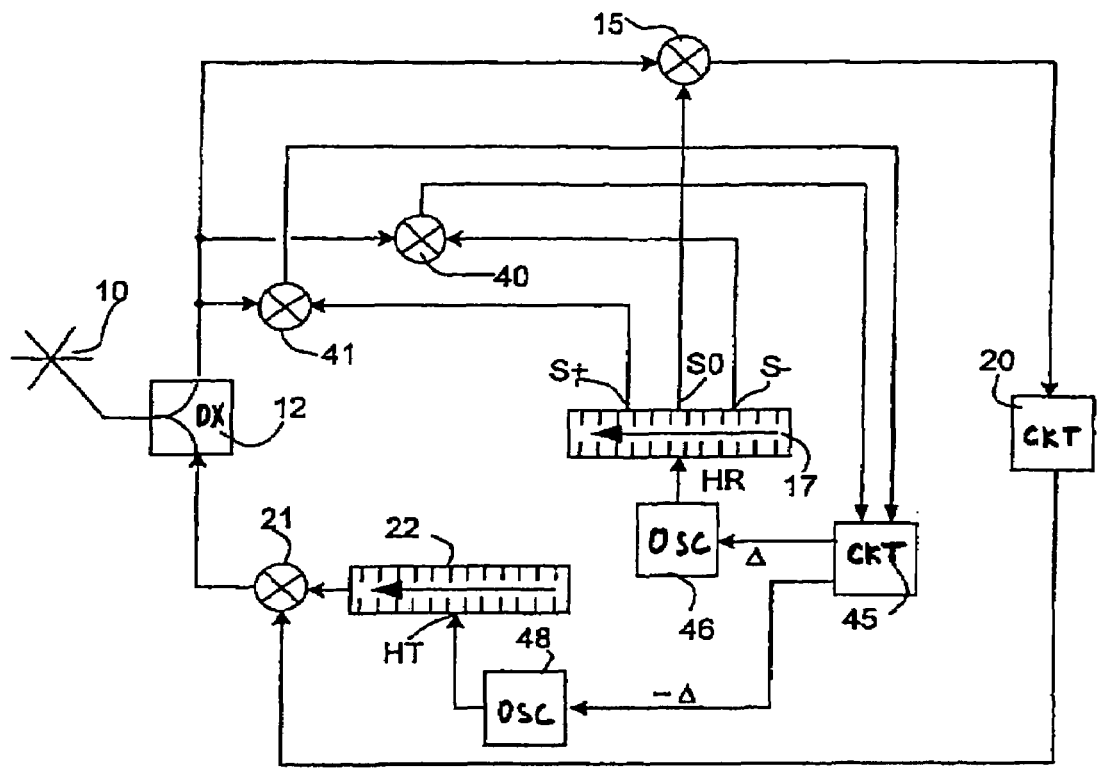
FIG. 2 represents a synchronizing circuit diagram of the stations of the second type.

FIG. 2 shows the synchronizing circuit in more detail. In this figure the common elements with those of the preceding Figure carry like references. Represented in the drawing Figure are the spectrum spreading word generators 17 and 22 in the form of shift registers. Thus, it is possible to take chip fractions of the word shifted with time. This is more important for the generator 17 than for the generator 22. On the generator 17 a first output SO corresponds to a satisfactory state of synchronism, that is to say, that the received spread spectrum words correspond to those locally generated on this output. An output S+ corresponds to chips or chip fractions already produced at SO and an output S− corresponds to chips or chip fractions that have just been produced. The outputs S− and S+ are connected respectively to the demodulators 40 and 41. Thus, in the case of frequency drift, the analysis of the output signals of these demodulators made by an analysis circuit 45 permits to know in what direction the frequency drift takes place and from there the frequency of the clock in the form of the oscillator 46 can be modified, so that with maximum correlation the signal on the output SO corresponds to the received data. For this purpose, a device called DLL is used (Delay Locked Loop) which the analysis circuit 45 forms part of. This circuit applies a frequency correction signal to the oscillator 46. From the circuit 45 is derived a frequency drift value A which is applied, on the one hand, as it is, to the receiving oscillator 46 and, with a different sign −Δ, to the transmitting oscillator 48.

Figure 3:
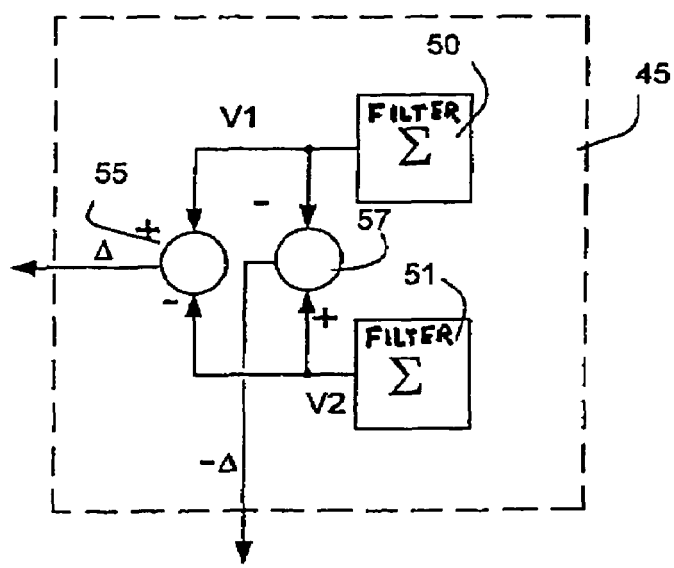
FIG. 3 represents an element of the synchronizing circuit shown in FIG. 2.

FIG. 3 explains the analysis circuit 45. Two integration filter circuits 50 and 51 connected respectively to the outputs of the demodulators 40 and 41 produce magnitudes V1 and V2. As these voltages linearly vary as a function of the time offset between the word generated on the respective output of the generator and the received word, the comparison of these two words made by the comparator circuit 55 produces a magnitude Δ which defines the correction to be made to the frequency of the oscillator 46 and the compensation −Δ to be applied to the transmitting oscillator 48. This is obtained via the comparator circuit 57.

Figure 4:
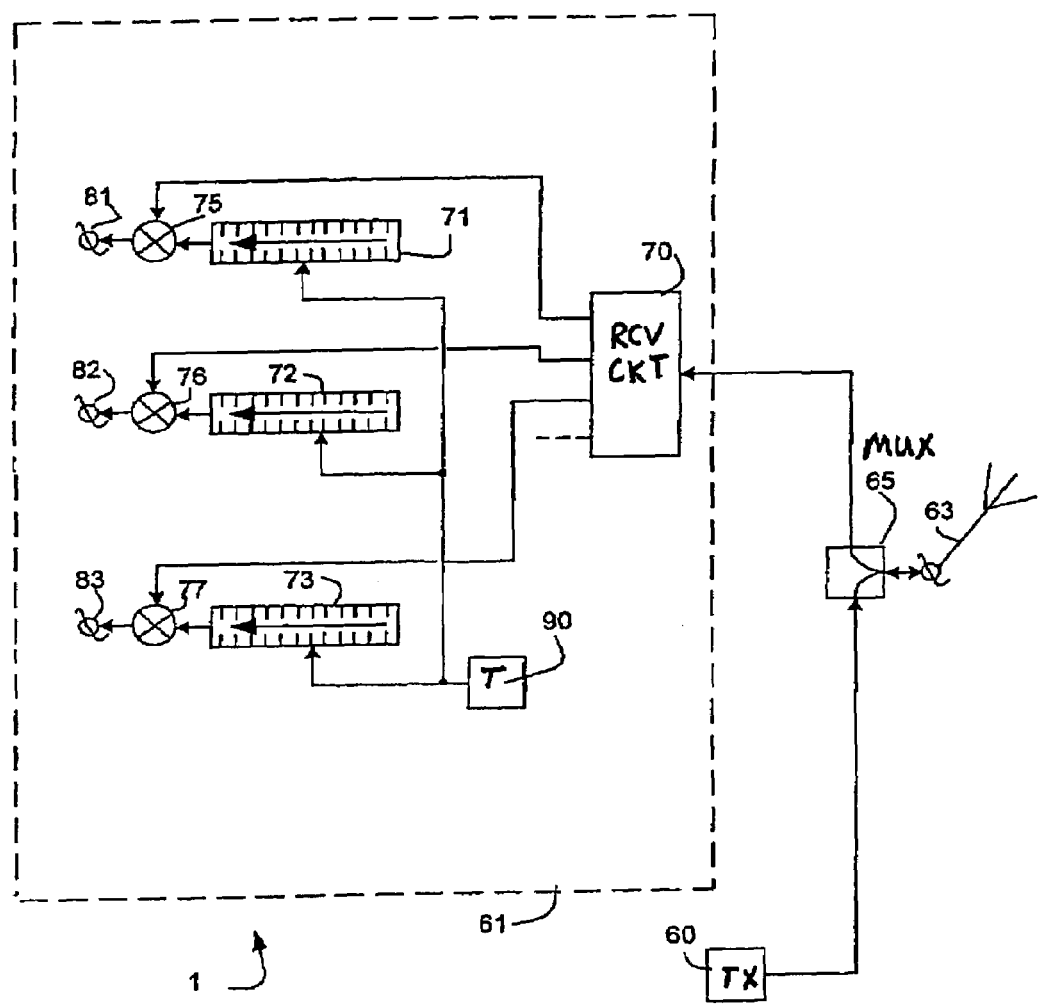
FIG. 4 represents a synchronizing circuit diagram of the stations of the first type.

FIG. 4 explains the structure of the base station of the first type. The station comprises a transmitting part 60 and a receiving part 61. These two parts utilize the same antenna 63 via a multiplexer 65. It is the receiving part 61 that is particularly interesting. This part comprises a receiving circuit 70 which produces on various outputs a stream of data relating to a plurality of stations of the second type. These data are sorted out via a spreading code assigned to each of these stations of the second type. These codes are generated by code generators 71, 72, 73 . . . which, by means of a correlator 75, 76, 77, . . . finally produce useful data on the terminals 81, 82, 83, . . . Thanks to the measures according to the invention a single time base 90 is used for fixing the timing of the code generators 71, 72, 73, . . .

What is claimed is:

1. A synchronization method suitable for a system comprising at least a station of first type and a station of a second type, both of which include a transmitting part capable of transmitting data at a transmit timing and a receiving part capable of synchronizing data transmitted from stations to provide a receive timing, characterized in that the method comprises the following steps:

providing the receiving part of the station of the second type with a synchronization circuit that generates chip fractions shifted in time, measuring a receive clock deviation made at the stations of the second type, and adjusting a transmit clock at the station of the second type by adopting the opposite deviation value to compensate for a frequency shift due to a movement of the station of the second type.

2. A method as claimed in claim 1, wherein the synchronization circuit provides chip fractions shifted in time produces a first output corresponding to a satisfactory state of synchronism.

3. A method as claimed in claim 2, wherein the synchronization circuit provides chip fractions shifted in time produces an already produced chip fraction output that contains chip fraction previously produced at the first output.

4. A method as claimed in claim 3, wherein the synchronization circuit provides chip fractions shifted in time produces a recently produced chip fraction output that contains chip fraction tat have just been produced.

5. A method as claimed in claim 4, wherein the receiving part of the station of the second type further comprises an analysis circuit receives chip fractions shifted in time by the synchronization circuit and determines a frequency drift, therefrom.

6. A method as claimed in claim 5, wherein the receiving part of the station of the second type further comprises means for modifying clock frequencies in response to the frequency drift.

* * * * *